US012088994B2

(12) United States Patent
Ren et al.

(10) Patent No.: US 12,088,994 B2
(45) Date of Patent: Sep. 10, 2024

(54) SPEAKER BOX

(71) Applicant: AAC Microtech (Changzhou) Co., Ltd., Changzhou (CN)

(72) Inventors: Zhang Ren, Shenzhen (CN); Zhiwei Zhong, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 215 days.

(21) Appl. No.: 17/535,717

(22) Filed: Nov. 26, 2021

(65) Prior Publication Data

US 2022/0201384 A1 Jun. 23, 2022

(30) Foreign Application Priority Data

Dec. 18, 2020 (CN) ........................ 202011507719.6

(51) Int. Cl.
*H04R 1/28* (2006.01)
*H04R 1/02* (2006.01)

(52) U.S. Cl.
CPC ........... *H04R 1/2811* (2013.01); *H04R 1/021* (2013.01); *H04R 2400/11* (2013.01); *H04R 2499/11* (2013.01)

(58) Field of Classification Search
CPC .............. H04R 2201/029; H04R 1/021; H04R 1/2803; H04R 1/2888; H04R 1/025; H04R 1/02; H04R 2307/207; H04R 2400/11; H04R 2499/11; H04R 7/127; H04R 7/12; H04R 7/16; H04R 7/18; H04R 9/06; H04R 9/045; H04R 9/046; H04R 9/025
See application file for complete search history.

(56) References Cited

U.S. PATENT DOCUMENTS

| | | | | |
|---|---|---|---|---|
| 8,615,098 | B2 * | 12/2013 | Yang | H04R 1/021 381/334 |
| 9,648,405 | B2 * | 5/2017 | Wang | H04M 1/03 |
| 9,838,816 | B2 * | 12/2017 | Wang | B29C 45/14336 |
| 9,948,342 | B2 * | 4/2018 | Shi | H04R 1/06 |
| 10,484,769 | B2 * | 11/2019 | Zhang | H04R 1/025 |
| 10,820,073 | B2 * | 10/2020 | Shan | H04R 1/20 |
| 10,932,022 | B2 * | 2/2021 | Yin | H04R 1/021 |
| 11,477,576 | B2 * | 10/2022 | Lu | B29C 45/14549 |
| 2013/0094685 | A1 * | 4/2013 | Seo | H04R 1/021 381/332 |
| 2017/0099548 | A1 * | 4/2017 | Schoeffmann | H04R 1/288 |

* cited by examiner

*Primary Examiner* — Dedei K Hammond
*Assistant Examiner* — Joseph James Peter Illicete
(74) *Attorney, Agent, or Firm* — W&G Law Group

(57) ABSTRACT

Provided is a speaker box, including a housing having receiving space, a sounding unit received in the housing, and a solder terminal electrically connecting the sounding unit to an external circuit. The housing includes a plastic member and a reinforced rigid body fixed to the plastic member by injection molding. The plastic member includes a bottom wall connected to the reinforced rigid body, a blocking wall connected to the bottom wall, and an enclosure extending from the bottom wall away from the reinforced rigid body. The solder terminal includes a main body portion, first and second electrical connection portions. The enclosure is separated from the blocking wall by a distance and encloses the main body portion. The enclosure and the reinforced rigid body are bonded by glue. The speaker box has low costs, simple assembly and high assembly stability.

3 Claims, 5 Drawing Sheets

A-A

SPEAKER BOX

TECHNICAL FIELD

The present disclosure relates to the field of acoustoelectric technologies, and in particular, to a speaker box applied to portable electronic products.

BACKGROUND

With the advent of the Internet era, the number of mobile terminal devices continues to rise. Among mobile devices, mobile phones are undoubtedly the most common and portable mobile terminal devices. At present, the mobile phones have extremely diverse functions, one of which is the high-quality music function. Therefore, speaker boxes configured to play sound are widely used in today's smart mobile devices.

In the related art, the speaker box includes a housing, a sounding unit received in the housing and a flexible printed circuit board connecting the sounding unit to an external circuit and configured to supply power to the sounding unit. The flexible printed circuit board is fixed to the housing by soldering. An assembly process includes coordination, tin soldering, slot gluing and other procedures, which is complex and needs hot points, pressurization and other procedures. The flexible printed circuit board is small in volume and poor in assembly accuracy. After assembly, there is also a need to make slot glue on an outlet slot. If the slot glue is not coated in place, the outlet slot may have a risk of air leakage. At the same time, the flexible printed circuit board is more expensive.

Therefore, there is a need to provide a new speaker box to solve the above technical problems.

SUMMARY

An objective of the present disclosure is to provide a speaker box with high assembly efficiency, low costs and good reliability.

In order to achieve the above objective, the present disclosure provides a speaker box, including a housing having a receiving space and a sounding unit received in the housing. The housing includes a plastic member and a reinforced rigid body fixed to the plastic member by injection molding. The plastic member includes a bottom wall connected to the reinforced rigid body and a blocking wall connected to the bottom wall. The sounding unit is mounted in the blocking wall. The speaker box further includes a solder terminal electrically connecting the sounding unit to an external circuit. The solder terminal includes a main body portion fixed to the bottom wall by injection molding. A first electrical connection portion extending from the main body portion to an exterior of the receiving space and electrically connected to the external circuit, and a second electrical connection portion extending from the main body portion and electrically connected to the sounding unit. The plastic member further includes an enclosure extending from the bottom wall to a direction away from the reinforced rigid body. The enclosure is separated from the blocking wall by a distance and encloses the main body portion, and the enclosure and the reinforced rigid body are bonded by glue.

As an improvement, the reinforced rigid body includes a body and a sidewall bending and extending from the body, the sidewall encloses the enclosure, the enclosure includes a first enclosure end away from the body and a second enclosure end close to the body, and the body is sprayed with glue at a position corresponding to the second enclosure end and fixed to the enclosure by injection molding.

As an improvement, the enclosure is spaced from the sidewall.

As an improvement, the first enclosure end is closer to the body than one end of the sidewall away from the body.

As an improvement, the blocking wall includes a first blocking wall end away from the body and a second blocking wall end close to the body, and the body is sprayed with glue at a position corresponding to the second blocking wall end and fixed to the blocking wall by injection molding.

As an improvement, the reinforced rigid body further includes a plurality of surrounding walls formed by extending from the body into the plastic member, the surrounding walls are enclosed to form a tapered through hole, the blocking wall further includes an injection molded portion arranged on the first blocking wall end, and the injection molded portion is fixed to the tapered through hole by injection molding.

As an improvement, the reinforced rigid body is made of a metal material.

Compared with the related art, the speaker box is electrically connected to the sounding unit by an injection-molded solder terminal instead of the conventional flexible printed circuit board. The solder terminal is used in the speaker according to the present disclosure, which not only reduces the costs but also reduces assembly complexity with respect to the flexible printed circuit board in the related art. The arrangement of the enclosure enhances strength of connection between the plastic member and the reinforced rigid body. Glue is applied to a position where the reinforced rigid body corresponds to the enclosure, and the enclosure is then molded by injection molding on the reinforced rigid body. Chemical chain layer and physical matching complement each other by bonding of functional group structures in the glue and molecules in the plastic member, so as to strengthen firmness of the connection between the enclosure and the reinforced rigid body and ensure stable assembly of the solder terminal.

BRIEF DESCRIPTION OF DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings without creative efforts. In the drawings.

DESCRIPTION OF EMBODIMENTS

Figure 1:
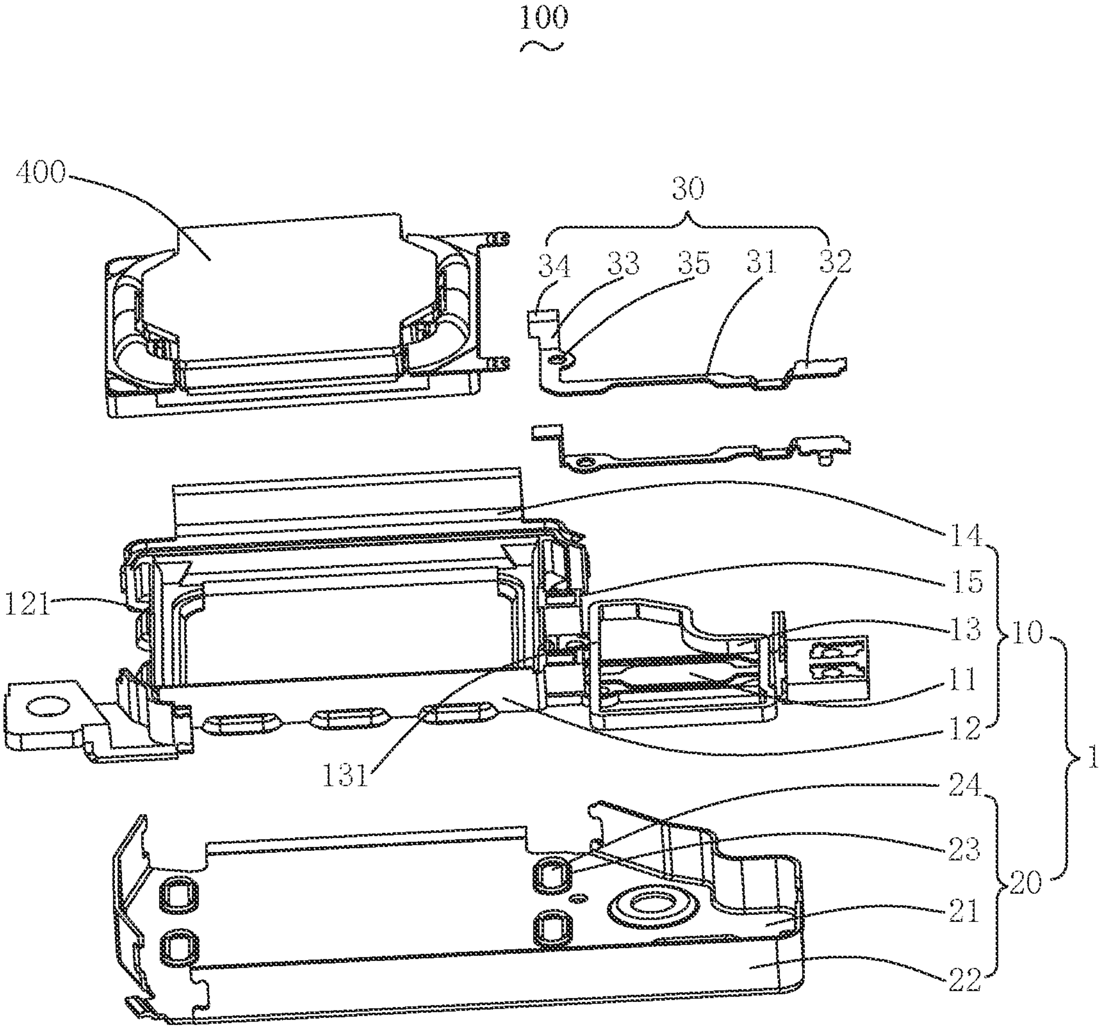
FIG. 1 is an exploded perspective view of a speaker box according to the present disclosure.
Figure 2:
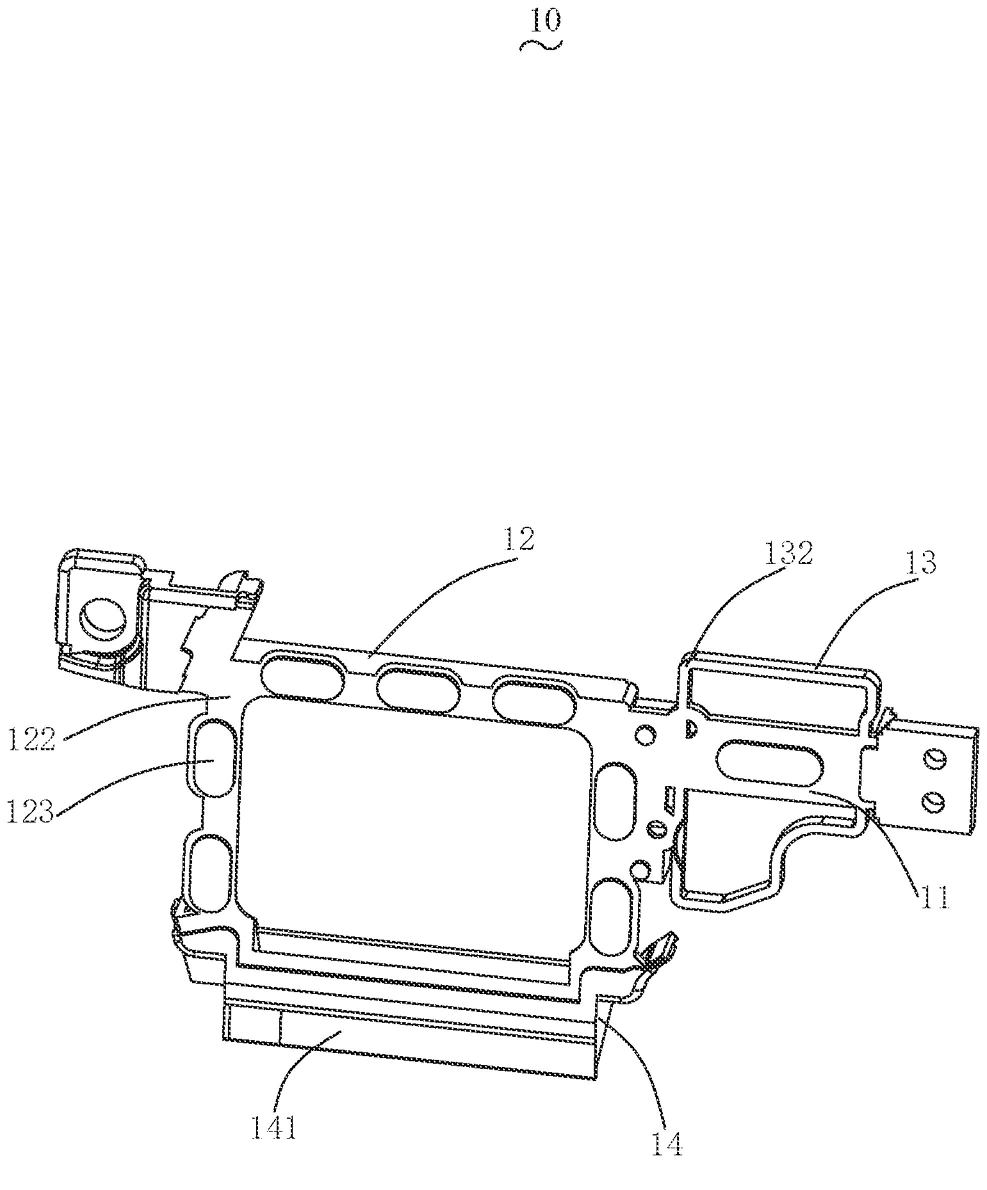
FIG. 2 is a schematic structural diagram of a plastic member in a housing shown in FIG. 1.

The technical solutions in embodiments of the present disclosure will be described clearly and completely below with reference to the accompanying drawings in the embodiments of the present disclosure. It is appreciated that, the described embodiments are merely some of rather than all of the embodiments of the present disclosure. All other embodiments acquired by those skilled in the art without creative efforts based on the embodiments of the present disclosure shall fall within the protection scope of the present disclosure.

Referring to FIG. 1 to FIG. 5, a speaker box 100 includes a housing 1 having a receiving space 40 and a sounding unit 400 received in the receiving space 40. The housing 1 includes a plastic member 10 and a reinforced rigid body 20 fixed to the plastic member 10 by injection molding. The plastic member 10 is further provided with a sound output channel 141 that transmits sound from the sounding unit 400 to the outside.

The plastic member 10 includes a bottom wall 11, a blocking wall 12 and an enclosure 13 that are connected to the bottom wall 11, and a sound output portion 14 protruding from an outer wall of the blocking wall 12. The blocking wall 12 is provided with a boss 15 formed by protrusion and extension from the bottom wall 11 to a direction away from the reinforced rigid body 20. The sounding unit 400 is mounted in the blocking wall 12. The sound output channel 141 is arranged in the sound output portion 14. The enclosure 13 is separated from the blocking wall 12 by a certain distance. The boss 15 is arranged close to the enclosure 13.

The reinforced rigid body 20 includes a body 21, a sidewall 22 bending and extending from an edge of the body 21, a plurality of surrounding walls 23 formed by extending from the body 21 into the plastic member 10 and a tapered through hole 24 enclosed by the surrounding walls 23. The bottom wall 11, the blocking wall 12 and the enclosure 13 of the plastic member 10 are all connected to the body 21. The tapered through hole 24 is filled with plastics of the blocking wall 12. The sounding unit 400 is mounted in the blocking wall 12. The sidewall 22 surrounds the blocking wall 12 and the enclosure 13.

In this embodiment, the reinforced rigid body 20 is made of a metal material. The reinforced rigid body 20 made of the metal material is not only conducive to strengthening the strength of the housing 1, but also conducive to heat dissipation of the speaker box 100. Generally, the reinforced rigid body 20 is made of a steel material.

In this embodiment, the surrounding walls 23 and the body 21 are integrally formed by punching.

Further, the blocking wall 12 includes a first blocking wall end 121 away from the body 21, a second blocking wall end 122 close to the body 21 and a plurality of injection molded portions 123 arranged on the second blocking wall end 122. The body 21 is sprayed with the glue 50 at a position corresponding to the second blocking wall end 122 and fixed to the blocking wall 12 by injection molding. The injection molded portions 123 fill the tapered through hole 24 and wrap the surrounding walls 23, so as to strengthen firmness of the connection between the blocking wall 12 and the body 21.

The enclosure 13 is ring-shaped, which is formed by protrusion and extension from the bottom wall 11 to a direction away from the reinforced rigid body 20. The enclosure 13 includes a first enclosure end 131 away from the body 21 and a second enclosure end 132 close to the body 21. The body 21 is sprayed with the glue 50 at a position corresponding to the second enclosure end 132 and fixed to the enclosure 13 by injection molding. In this embodiment, the enclosure 13 is spaced from the sidewall 22, and the first enclosure end 131 is closer to the body 21 than one end of the sidewall 22 away from the body 21.

It is to be noted that, the second blocking wall end 122 and the second enclosure end 132 are both connected to the body 21 through the glue 50, and chemical chain layer and physical embedding complement each other by bonding of functional group structures in the glue 50 and molecules in the plastic member 10, so as to strengthen firmness of the connection of the blocking wall 12 and the enclosure 13 to the body 21 of the reinforced rigid body 20, so that the blocking wall 12 and the enclosure 13 may not fall off from the body 21.

In addition, the second blocking wall end 122 of the blocking wall 12 is connected to the body 21 through the glue 50, the connection therebetween is firm, and the injection molded portion 123 of the blocking wall 12 and the surrounding wall 23 and the tapered through hole 24 of the reinforced rigid body 20 may be eliminated, so that a structure at the connection between the blocking wall 12 and the reinforced rigid body 20 is simple, which reduces occupation of the volume of the receiving space 40, thereby increasing the volume of the rear cavity, improving FO of the speaker box and enhancing its acoustic performance.

Further, the speaker box 100 further includes a solder terminal 30. The solder terminal 30 includes a main body portion 31 fixed to the bottom wall 11 by injection molding, a first electrical connection portion 32 extending from the main body portion 31 to the exterior of the receiving space 40 and fixed to the bottom wall 11 by injection molding, an extension portion 33 formed by bending and extending from the main body portion 31 and injection-molded in the boss 15 and a second electrical connection portion 34 formed by bending and extending from the extension portion 33 and fixed to the boss 15 by injection molding. The enclosure 13 encloses at least part of the main body portion 31. The first electrical connection portion 32 and the second electrical connection portion 34 are located outside the enclosure 13. The first electrical connection portion 32 is electrically connected to the external circuit. The second electrical connection portion 34 is exposed on one side of the boss 15 away from the bottom wall 11 and is electrically connected to the sounding unit 400.

The solder terminal 30 is fixed to the plastic member 10 by injection molding. That is, at least part of the plastic member 10 is located on the bottom wall 11 to enable the main body portion 31 and the first electrical connection portion 32 to be fixed to the bottom wall 11 by injection molding, and at least part of the plastic member 10 forms the boss 15 to enable the extension portion 33 and the second electrical connection portion 34 to be fixed to the boss 15 by injection molding.

Figure 3:
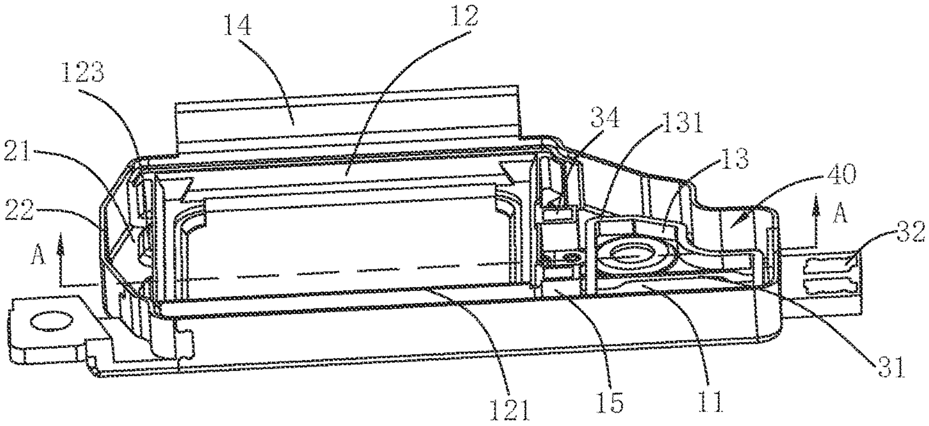
FIG. 3 is a schematic structural diagram after assembling of the housing shown in FIG. 1 with a solder terminal.
Figure 4:
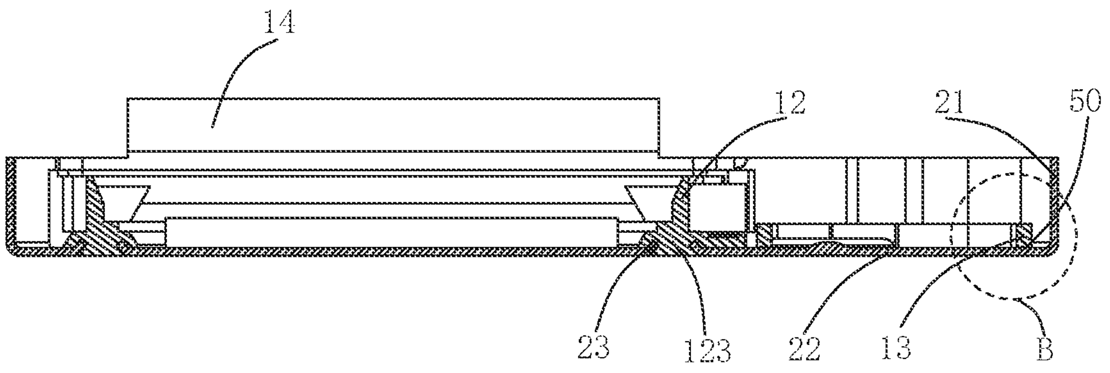
FIG. 4 is a sectional view of the speaker box shown in FIG. 3 taken along a direction A-A.
Figure 5:
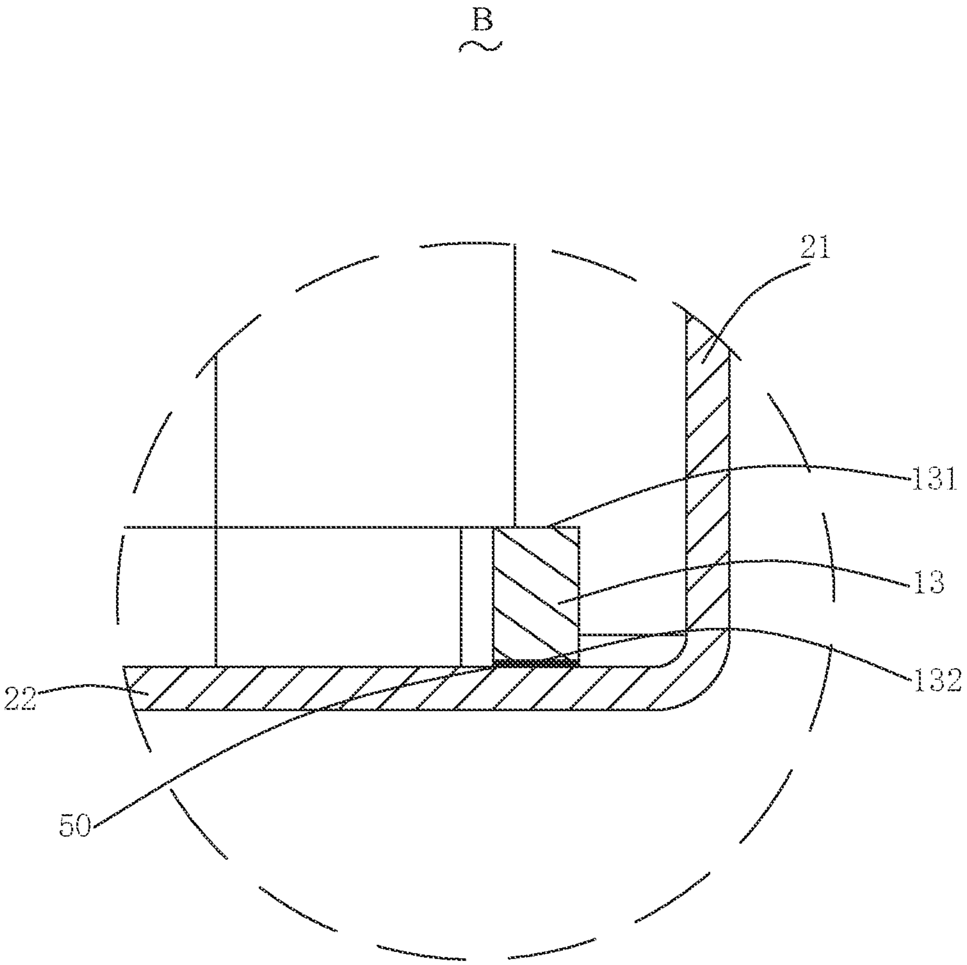
FIG. 5 is an enlarged view of a part B in the speaker box shown in FIG. 4.

As shown in FIG. 1 and FIG. 3, two solder terminals 30 are provided. The two solder terminals 30 are respectively a positive electrode solder terminal and a negative electrode solder terminal, so as to be electrically connected to a positive electrode and a negative electrode of the sounding unit 400, respectively.

As shown in FIG. 3, the blocking wall 12 is far away from an outer contour of a product, and a longer solder terminal 30 is required to be electrically connected to the sounding unit 400 mounted in the blocking wall 12. Relative positions of the first electrical connection portion 32 and the second electrical connection portion 34 of the solder terminal 30 in an injection mold cannot be guaranteed by the strength of the solder terminal 30 alone. In this embodiment, the main body portion 31 is provided with a positioning hole 35. The arrangement of the positioning hole 35 on the main body portion 31 can ensure the relative positions of the first electrical connection portion 32 and the second electrical connection portion 34 in the injection mold.

In this embodiment, a surface of one side of the second electrical connection portion 34 away from the extension portion 33 is coplanar with a surface of one side of the boss 15 away from the bottom wall 11.

It may be understood that, in other embodiments, the composition of the housing 1 is not limited thereto. For example, the housing 1 may also be made of plastic only.

The speaker box according to the present disclosure is electrically connected to the sounding unit by an injection-molded solder terminal instead of the conventional flexible printed circuit board. The solder terminal is used in the speaker, which not only reduces the costs but also reduces assembly complexity with respect to the flexible printed circuit board in the related art. The arrangement of the enclosure enhances strength of connection between the plastic member and the reinforced rigid body. Glue is applied to a position where the reinforced rigid body corresponds to the enclosure, and the enclosure is then molded by injection molding on the reinforced rigid body. Chemical chain layer and physical embedding complement each other by bonding of functional group structures in the glue and molecules in the plastic member, so as to strengthen firmness of the connection between the enclosure and the reinforced rigid body and ensure stable assembly of the solder terminal.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A speaker box, comprising:

a housing having a receiving space; and a sounding unit received in the housing, the housing comprising a plastic member and a reinforced rigid body fixed to the plastic member by injection molding, the plastic member comprising a bottom wall connected to the reinforced rigid body and a blocking wall connected to the bottom wall, the sounding unit being mounted in the blocking wall, wherein the speaker box further comprises a solder terminal electrically connecting the sounding unit to an external circuit, the solder terminal comprises a main body portion fixed to the bottom wall by injection molding, a first electrical connection portion extending from the main body portion to an exterior of the receiving space and electrically connected to the external circuit, and a second electrical connection portion extending from the main body portion and electrically connected to the sounding unit, the plastic member further comprises an enclosure extending from the bottom wall to a direction away from the reinforced rigid body, the enclosure is separated from the blocking wall by a distance and encloses the main body portion, and the enclosure and the reinforced rigid body are bonded by glue, the reinforced rigid body entirely made of a metal material comprises a body, a sidewall bending and extending from the body, and a plurality of surrounding walls formed by extending from the body into the plastic member, the sidewall encloses the enclosure, the enclosure comprises a first enclosure end away from the body and a second enclosure end close to the body, and the body is sprayed with glue at a position corresponding to the second enclosure end and fixed to the enclosure by injection molding, the blocking wall comprises a first blocking wall end away from the body, a second blocking wall end close to the body, and an injection molded portion arranged on the first blocking wall end, the body is sprayed with glue at a position corresponding to the second blocking wall end and fixed to the blocking wall by injection molding, the surrounding walls are enclosed to form a tapered through hole, the injection molded portion is fixed to the tapered through hole by injection molding.

2. The speaker box as described in claim 1, wherein the enclosure is spaced from the sidewall.

3. The speaker box as described in claim 2, wherein the first enclosure end is closer to the body than one end of the sidewall away from the body.

* * * * *